United States Patent [19]

Wössner et al.

[11] 4,023,360

[45] May 17, 1977

[54] APPARATUS FOR THE DETOXIFICATION OF EXHAUST GASES IN INTERNAL COMBUSTION ENGINES

[75] Inventors: Günter Wössner, Esslingen; Josef Zweng, Warmbronn; Ernst Linder, Muhlacker, all of Germany

[73] Assignee: Robert Bosch G.m.b.H., Stuttgart, Germany

[22] Filed: Oct. 22, 1974

[21] Appl. No.: 517,020

[30] Foreign Application Priority Data

Oct. 23, 1973  Germany .......................... 2352965

[52] U.S. Cl. ........................... 60/277; 23/288 FA; 60/286; 60/288
[51] Int. Cl.² ......................................... F01N 3/15
[58] Field of Search .................... 60/288, 277, 286; 23/288 FA

[56] References Cited

UNITED STATES PATENTS

| | | | |
|---|---|---|---|
| 3,050,935 | 8/1962 | Eastwood | 60/288 |
| 3,144,309 | 8/1964 | Sparrow | 60/288 |
| 3,180,712 | 4/1965 | Hamblin | 60/288 |
| 3,440,817 | 4/1969 | Saufferer | 60/288 |
| 3,783,619 | 1/1974 | Alquist | 60/288 |
| 3,844,119 | 10/1974 | Herrbrich | 60/288 |

FOREIGN PATENTS OR APPLICATIONS 1,948,777  4/1970  Germany .......................... 60/288

*Primary Examiner*—Douglas Hart
*Attorney, Agent, or Firm*—Edwin E. Greigg

[57] ABSTRACT

The exhaust system of an internal combustion engine which includes one or several, sequential catalytic reactors is provided with a bypass channel through which some portion of the exhaust gases may be diverted. This diversion takes place whenever the gas flow rate becomes so high that the operating temperatures of one or more of the reactors would be exceeded. The gases flowing through the bypass channel are cooled prior to their reintroduction into the main exhaust pipe channel. The diversion of part of the gas stream into the bypass channel is accomplished with the aid of a control current of exhaust gas tapped off from the exhaust line and conducted back upstream to the junction of the main channel and the bypass channel. The force of this control current deviates the exhaust gases from their normal path and causes them to flow into the bypass channel.

2 Claims, 7 Drawing Figures

APPARATUS FOR THE DETOXIFICATION OF EXHAUST GASES IN INTERNAL COMBUSTION ENGINES

BACKGROUND OF THE INVENTION

The invention relates to an apparatus for detoxification of exhaust gases in internal combustion engines including at least one thermal or catalytic reactor and including a bypass for the exhaust pipe through which at least a portion of the exhaust gases may be diverted to avoid overheating the catalytic reactor.

In order to ensure satisfactory operaton of a catalytic reactor, its operating temperature should lie within a predetermined range and must not exceed a certain maximum value if a satisfactory service life is to be achieved. In known apparatus of the above described type, when the exhaust gases reach this maximum temperature, they are either brought out into the open air, or they are conducted around the reactor through a bypass. The reactor itself also may be swiveled out of the gas flow. In all of these cases, no detoxification of the exhaust gases occurs during that time.

It is also known to conduct the exhaust gases through a series of sequential reaction chambers which delay but do not prevent the occurrence of a maximum operational temperature so that, even in this case, the catalytic action may still have to be suspended.

OBJECT AND SUMMARY OF THE INVENTION

It is the basic object of the invention to provide an apparatus of the above-described type, but so improved that exhaust gases may flow through the reactor continuously and throughout the entire operational domain of the internal combustion engine without causing overheating of the catalytic reactor.

This object is attained, according to the invention, by installing a cooling system for the exhaust gases within a bypass channel which rejoins the main exhaust pipe ahead of the reactor as seen in the direction of flow. Thus, the exhaust gases which continue to flow through the exhaust pipe and those gases which were cooled in the bypass are rejoined ahead of the reactor so that an excessive temperature does not occur therein.

According to an advantageous feature of the invention, the deviation of the exhaust gases is controlled by a preferably monostable fluid control system which deviates at least a portion of the mass flow into the bypass when the magnitude of this mass flow exceeds a certain value. This design presupposes that the temperature in the reactor depends substantially on the gas throughput. Thus, as soon as a particular mass flow rate is reached and an overheating of the reactor must be expected, the gas stream is at least partially detoured into the bypass where the gas is cooled and is then rejoined with the remaining stream ahead of the reactor. Advantageously, fluid control systems have no moving parts which would be particularly prone to failure when used in exhaust pipes. p According to an advantageous feature of the invention, the cooling system is embodied as a cooling chamber disposed coaxially with the exhaust pipe and provided with heat exchanger elements such as heat pipes, leading to the outside environment. The heat transfer to the parts carrying the heat to the outside may be improved by creating suitable turbulence in the exhaust gases.

A supplementary feature of the invention provides that a control line connects the induction tube of the engine to the control location within the exhaust pipe so that the engine vacuum may be used for fluidic control of the exhaust gases. A further embodiment of the fluid control system according to the invention provides a vortex chamber which receives a radial and a tangential stream of exhaust gas and delivers an axial stream of the combined gases for delivery into a pair of coaxial tubes. The outer one of this pair of tubes serves at least partially as the cooling bypass, either directly or after transition to one single tube.

According to an especially advantageous design of the invention, the section of the exhaust pipe detoured by the bypass contains a catalytic reactor which becomes effective at relatively low temperatures (warm-up catalyzer). The purpose of this reactor is to ensure exhaust gas purificaion even when the engine is cold and when, therefore, the exhaust gases have temperatures which are too low to sustain a reaction in the main catalyzer. The main reactor is dimensioned for the maximum exhaust gas flow rate, i.e., it has a relative large active surface area corresponding to the highest permissible volumetric velocity, whereas the warm-up catalyzer has a relatively small flow cross section and a small volume, so that it heats up faster and "starts-up" correspondingly sooner. Subsequently, in the domain of higher engine load and rpm, when the flow velocities in the main catalyzer volume become so great that the available surfaces would be insufficient to reduce the concentration of contaminants, then, according to the invention, the exhaust gases are partialy detoured through the cooling bypass. According to the invention, the relief of the main reactor may be further enhanced by disposing another reactor in the cooling bypass which performs a partial decontamination of the exhaust gases passing through it.

The invention will be better understood, as well as further objects and advantages will become more apparent, from the ensuing detailed specification of two exemplary embodiments taken in conjuction with the drawing.

DESCRIPTION OF THE PREFERRED EMBODIMENT

Figure 1:
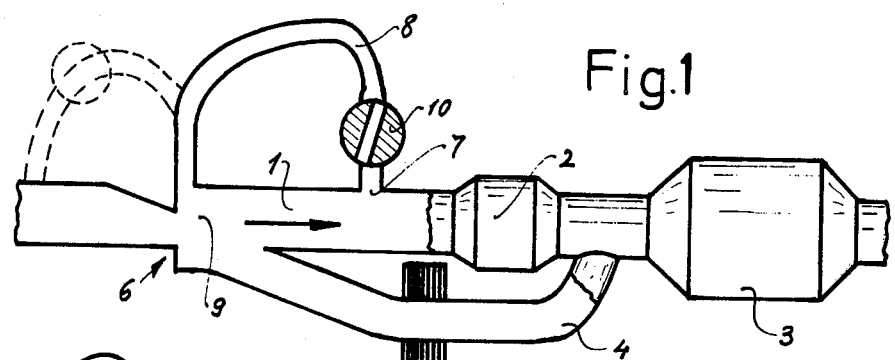
FIG. 1 represents a simple fluid control system according to the invention.

FIG. 1 is a partial representation of an exhaust system in which exhaust gases flow in the direction of the arrow through an exhaust pipe 1, containing, seriatim, a warm-up catalyzer 2, and a main catalyzer 3. The warm-up catalyzer 2 is circumvented by a bypass 4, which rejoins the exhaust pipe 1 ahead of the main catalyzer 3. The bypass 4 serves for cooling the exhaust gases and, accordingly, is provided with a cooling system 5, indicated schematically in the figure. At the location indicated by the numeral 6, the exhaust pipe 1 has a narrowed waist and an adjacent, abrupt cross-sectional enlargement, and this structure is part of a fluid control system. When the engine operates under low load and at low rpm, all the exhaust gas flows through the exhaust pipe 1 and through the warm-up catalyzer 2. At the location indicated by the numeral 7, a control line 8 branches off from the exhaust pipe 1. Through this control line 8, exhaust gas is fed back to the control location 9 where the exhaust pipe is provided with the abrupt cross-sectional enlargement. The control line 8 contains an adjustable throttling mechanism 10. When the flow rate of exhaust gas throught the exhaust pipe 1 exceeds a certain value, and depending on the position of the throttling device within the control line 8, the stream of exhaust gas is at least partially diverted into the bypass 4 due to the Coanda effect. Due to the diversion of part of the exhaust gas stream, the gas flow through the control line 8 is reduced or ceases, which causes a redirection of the full gas stream back into the exhaust pipe 1. Accordingly, as soon as the appropriate exhaust gas quantity flow rate is achieved, a stream of exhaust gas passes alternately through the exhaust pipe 1 or through the bypass 4 and back again, acting in the manner of an oscillator. The exhaust gases which have been cooled in the bypass 4 rejoin the main exhaust gas stream carried in the exhaust pipe 1 ahead of the main catalyzer 3 and the gas mixture is brought to a temperature which is always below the permissible maximum operating temperature of the main catalyzer 3. The frequency of the generated oscillations depends on the length of the control line 8, among other factors. The control line can also branch off from the exhaust pipe ahead of the narrowed waist 6, as seen in the direction of flow; this disposition is shown dotted in FIG. 1. With a "forward control" of this kind, no oscillations occur.

Because of the relatively high gas flow velocity, the warm-up catalyzer 2 is rapidly heated even at low gas flow rates (idling partial load). The high gas throughput velocity is obtained by providing the warm-up catalyzer with small cross-sectional areas having good thermal transfer properties. In this way, the warm-up catalyzer "ignites" sooner than the subsequent main catalyzer 3. During full load and high rpm operation, a portion of the large quantity of exhaust gas is cooled within the bypass 4, especially so as to prevent overheating of the warm-up catalyzer.

Figure 2:
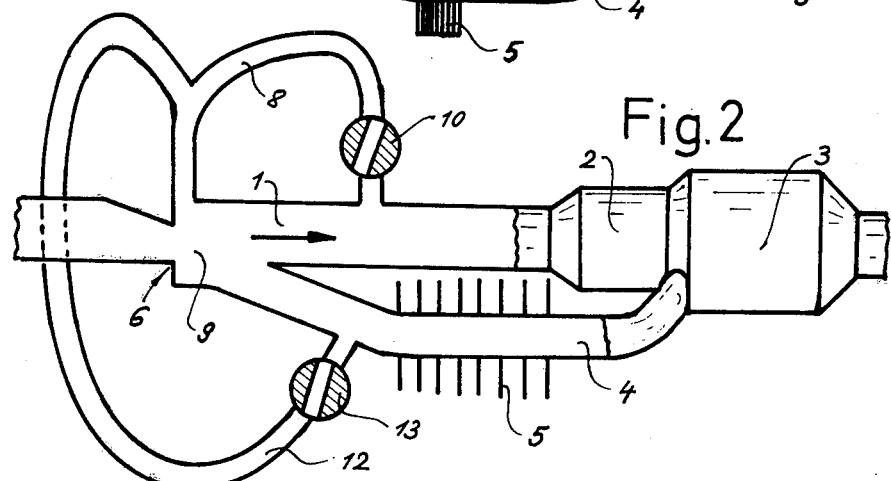
FIG. 2 shows a variant of the fluid control system according to FIG. 1 with a slightly different cooling system.

The apparatus shown in FIG. 2 which is substantially identical to that shown in FIG. 1, includes a second control line 12, which branches off from the bypass 4 and serves to stabilize the deviation of part of the gas stream. It also includes a throttle mechanism 13. This second control line 12 terminates in the first control line 8. This arrangement maintains a control current even after the exhaust gas stream has been partly deviated into the bypass 4 and tends to keep it flowing in that direction. The length and cross section of the control lines 8 and 12 as well as the effect of the throttle mechanisms 10 and 13 determine the magnitude of the gas throughput flow rate at which a switch-over takes place from the exhaust pipe to the bypass and back again. In the exemplary embodiment according to FIG. 2, the bypass 4 terminates tangentially in the main catalyzer 3. This results in a good mixture of the cooled and uncooled exhaust gases and also results in a good flow distribution within the catalyzer itself. Futhermore engine-induced pressure pulsations are artificially damped. In this example, the housing of the warm-up catalyzer 2 is directly connected to that of the main catalyzer 3.

Figure 3:
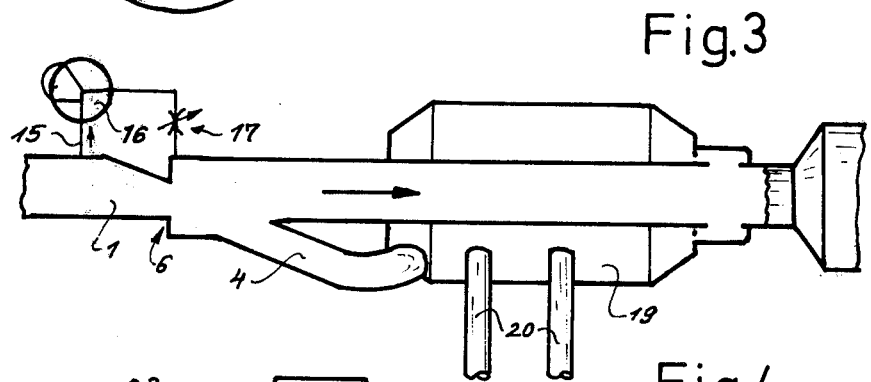
FIG. 3 shows another variant of the fluid control system similar to those of FIGS. 1 and 2; p

FIG. 3 shows an apparatus according to the invention in which the fluid controlled deviation of the gas stream into the bypass is performed in temperature-dependent manner. A control line 15 branches off from the exhaust pipe 1 ahead of the narrow waist 6 and contains an oscillator mechanism 16 and a throttling mechanism 17. The oscillator mechanism functions as a fluid control element whose method of operation is the same as that explained in connection with the exemplary embodiment according to FIG. 1 and whose frequency is proportional to the square root of the absolute gas temperature based on the velocity of sound in gases. The output control power of the oscillator is jointly proportional to the gas pressure and to the volume of gas flowing per unit time. When the frequency increases (increasing gas temperature) the volume of gas also increases. When the gas volume per unit time exceeds a certain threshold value, which is adjustable by means of the throttle mechanism 17, the gas stream, or a portion thereof, is deviated from the exhaust pipe into the bypass 4 where it is suitably cooled.

In this example, the cooling system is embodied as a coaxial housing 19, surrounding the exhaust pipe 1 and provided with a large heat transfer surface. The bypass 4 terminates tangentially in the housing 19. This type of tangential termination ensures satisfactory gas turbulence and good heat transfer. The heat transfer rate can be further increased by including heat pipes 20.

The control process may be made more sensitive by making the flow cross sections of the throttle mechanisms 10, 13 and 17 adjustable depending on the catalyzer temperature. Thus, when the engine is warmed-up, a control process would ensure that the gas temperature at the entrance of the catalyzer is always the maximum permissible temperature for the particular operational state of the engine so that the catalyzer would be utilized in optimum fashion.

Figure 4:
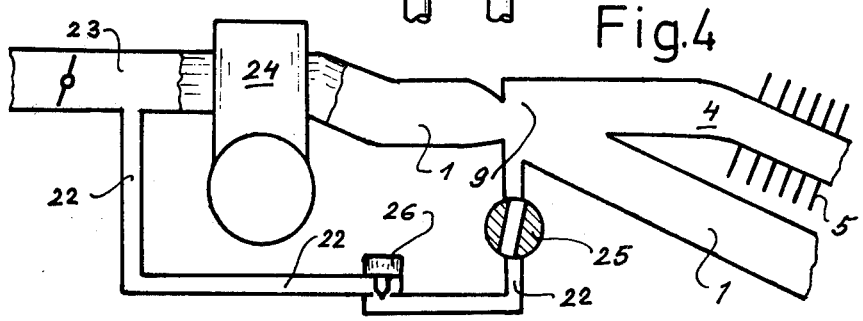
FIG. 4 shows a control system operating in dependence on the induction tube pressure.

In the exemplary embodiment according to FIG. 4, the fluid controlled process makes use of a vacuum created at the control location 9 by a control line 22 which leads to the induction tube 23 of the internal combustion engine 24. This control line 22 also includes a throttling mechanism 25 and a preferably electromagnetically actuated valve 26 for controlling the exhaust gas feedback channel. During idling and partial load operation, the vacuum in the induction tube and, hence, also in the control line 22 is relatively high, because the absolute induction tube pressure is relatively low. In contrast to the function of the other preferred examples, a deviation of the exhaust gas stream does take place under these conditions, namely into the exhaust pipe 1. During low vacuum however, i.e. when the absolute induction tube pressures are relatively high, i.e. when the throttle flap is open during full load operation, no deviation of the exhaust gas stream occurs, and the gas is immediately guided into the bypass which lies in the preferred direction. In this control system, which depends on the induction tube pressure, the control pressure is relatively low. If required, amplification of the control gas current may be achieved by connecting several fluid control elements in series.

Figure 5:
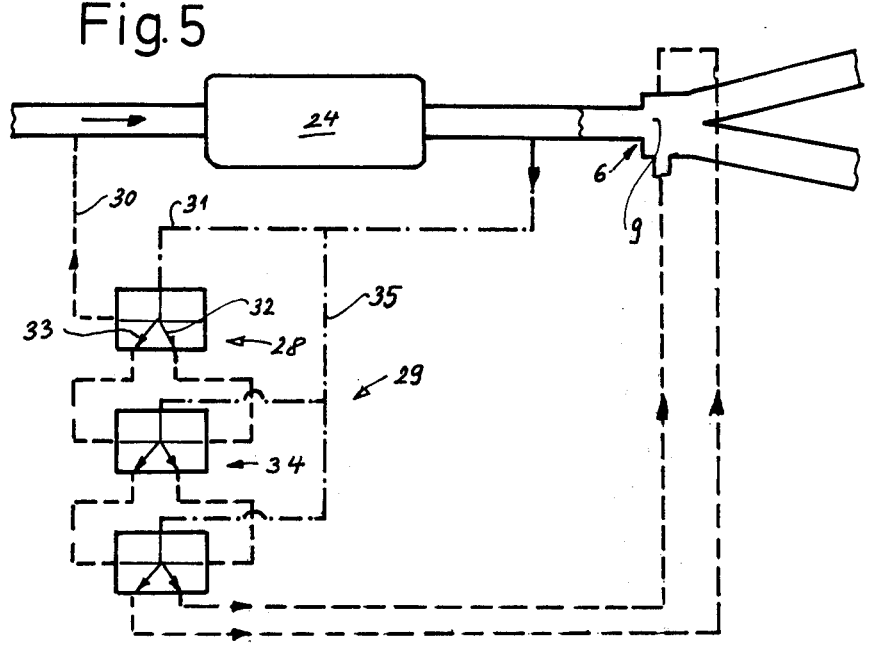
FIG. 5 is a schematic diagram of a fluid control amplifier system.

FIG. 5 shows an example of "forward control" (feed forward) amplification. The first fluid control element 28 belongs to the amplifier assembly 29 located outside of the exhaust pipe and includes a control line 30 and a supply line 31. The control line 30 carries induction tube pressure and the supply line 31 carries the pressure in the exhaust pipe ahead of the cross section change 6. During full load operation, the gas flows, for example, into the branch line 32 (preferred direction) and during idling operation, it is deviated into the branch line 33. The outputs of this first fluid control element 28 serve at the same time as the control streams for the first stage of the subsequent two-stage fluid control element 34 whose supply current is taken from the exhaust pipe through a line 35. The control force due to the supply pressure is substantially higher than that of the induction tube vacuum and is thus better suited to control the deviation of the gas stream at the location 9. The control process is steered, however, by using the relatively weak forces due to the induction tube vacuum.

Figure 6:
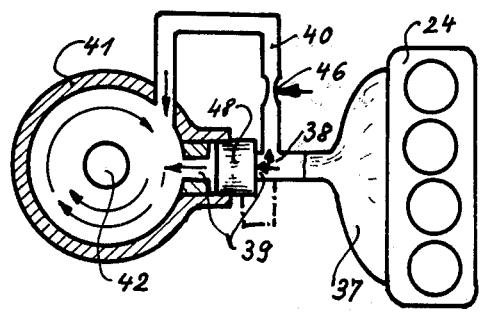
FIG. 6 shows a fluid control system using a vortex chamber.
Figure 7:
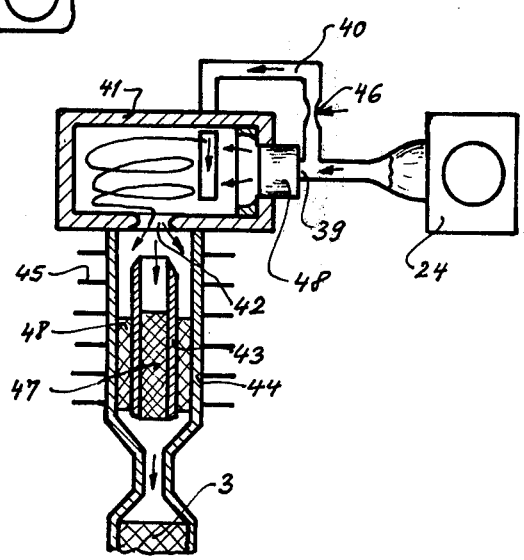
FIG. 7 shows a fluid control system in a coaxial configuration.

FIGS. 6 and 7 show an exemplary embodiment of a fluid control system using a vortex chamber. At the location 38, immediately behind the exhaust manifold 37 of the engine 24, the exhaust gas stream is divided into two partial streams. One partial stream is carried into the vortex chamber 41 radially, through a line 39, and the other partial stream is carried into the vortex chamber 41 tangentially, through a line 40.

As may be seen from FIG. 7, the vortex chamber has an axial outlet 42, to which are connected two coaxial tubes 43 and 44. The inner tube 43 corresponds functionally to the exhaust pipe 1 depicted in previous figures, and the outer tube 44 corresponds to the bypass 4 in the previous exemplary embodiments. The outer tube 44 is provided with suitable cooling fins 45. When the gas throughput is small, most of the exhaust gas flows through the tube 39 and enters the vortex chamber radially. It leaves the chamber in a closely bunched stream which almost completely flows through the inner tube 43. At these low throughputs, the energy of the gas entering the vortex chamber tangentially through the line 40 is insufficient for creating a well-defined rotary flow within the vortex chamber. However, beginning at a certain value of the exhaust gas mass flow, which value may be adjusted by a throttling element 46 located in the tube 40, the momentum of the tangential gas stream is high enough to create a well defined rotary flow in the vortex chamber. When a pressure regulator 48 (a constant pressure valve) is installed in the radial line 39, then, during increasing gas flow, the axial flow through the vortex chamber is changed to turbulent flow within a very narrow region of the gas throughput. This is so because, as the gas throughput increases, beginning with a certain value of the throughput, the tangential gas stream completely blocks off the radial gas stream which is approximately held constant by the constant pressure valve. Due to the centrifugal forces occurring in the described vortex flow, the exhaust gases leave the outlet aperture 42 in a cone-shaped configuration which primarily enters the outer coaxial tube 44. A warm-up catalyzer 47 may be disposed within the inner tube 43 as described above. The dual tube configuration also creates a supplementary heat shield for the warm-up catalyzer which aids in its rapid heating during idling operation. An annular catalyzer 48 may be disposed between the inner tube 43 and the outer tube 44 in support of the operation of the subsequent main catalyzer 3 through which all gases finally flow.

What is claimed is:

1. In an apparatus for detoxification of the exhaust gases of an internal combustion engine, including an exhaust system with an exhaust pipe and at least one thermal or catalytic reactor located in the path of the exhaust gases and including a bypass channel connected at its two ends to the exhaust gas pipe so that exhaust gases may be diverted to prevent overheating the reactor, the improvement comprising:

means defining a branchoff location of the exhaust pipe to which one end of the bypass channel is connected thereby maintaining a continuous communication of the bypass channel with the exhaust gas flow at the branchoff location;

cooling means, attached to said bypass channel for cooling the exhaust gases flowing through said bypass channel;

means providing that said bypass channel is rejoined at its other end with the exhaust pipe upstream of said reactor; and a fluid flow control system including at least one control line channel connected at one end to the exhaust pipe in the region of said branchoff location and at its other end to the exhaust pipe downstream of said branchoff location and a cross section adjustment means contained within said control line channel so that said control line channel is in continuous communication with the flow of exhaust gas in the exhaust pipe; whereby conditions within said control line channel serve to effect fluidic control over the exhaust gas flowing in the region of said branchoff location in the exhaust pipe and as a result can divert at least part of the exhaust gas stream in the exhaust pipe into the bypass channel whenever a predetermined mass flow rate of the exhaust gas in the exhaust pipe is reached, achieving thereby an oscillation of this exhaust gas stream between the exhaust pipe and the bypass channel.

2. In an apparatus for detoxification of the exhaust gases of an internal combustion engine, including an exhaust system with an exhaust pipe and at least one thermal or catalytic reactor located in the path of the exhaust gases and including a bypass channel, which leaves the exhaust pipe at a branchoff location and rejoins it farther downstream thereof, and through which exhaust gases may be diverted to prevent overheating the reactor, the improvement comprising:

cooling means, attached to said bypass channel for cooling the exhaustd gases flowing through said bypass channel;

means providing that said bypass channel is rejoined with the exhaust pipe upstream of said reactor; and a fluid control system, operatively associated with the exhaust system, which can divert at least part of the exhaust gas stream into said bypass channel after a predetermined mass flow rate of the exhaust gas is reached, said fluid control system including;

i. a first control line channel which is connected to the exhaust pipe and rejoins the exhaust pipe in the region of said branchoff location, said control line channel containing cross section adjustment means; whereby conditions within said control line channel serve to effect fluidic control over fluids flowing in the region of said branchoff location in the exhaust pipe; and ii. a second control line channel containing second cross section adjustment means, said second control line channel being connected between said bypass channel and said first control line channel.

* * * * *